United States Patent
Ogishi et al.

(10) Patent No.: US 6,178,450 B1
(45) Date of Patent: Jan. 23, 2001

(54) METHOD AND APPARATUS FOR MONITORING A COMMUNICATION LINK BASED ON TCP/IP PROTOCOL BY EMULATING BEHAVIOR OF THE TCP PROTOCOL

(75) Inventors: Tomohiko Ogishi, Wako; Akira Idoue, Toda; Toshihiko Kato, Asaka; Kenji Suzuki, Komae, all of (JP)

(73) Assignee: Kokusai Denshin Denwa Co., Ltd., Tokyo (JP)

( * ) Notice: Under 35 U.S.C. 154(b), the term of this patent shall be extended for 0 days.

(21) Appl. No.: 09/108,197

(22) Filed: Jul. 1, 1998

(30) Foreign Application Priority Data

Jul. 1, 1997 (JP) .................................................. 9-175414

(51) Int. Cl.[7] .................................................. G06F 13/00
(52) U.S. Cl. .......................... 709/224; 709/232; 709/235; 709/318
(58) Field of Search .................................. 709/202, 223, 709/224, 226, 230, 232, 235, 237, 318; 714/33, 37, 39, 50; 370/229, 230, 232, 235

(56) References Cited

U.S. PATENT DOCUMENTS

| | | | | |
|---|---|---|---|---|
| 5,247,517 | * | 9/1993 | Ross et al. | 370/452 |
| 5,347,524 | * | 9/1994 | I'Anson et al. | 714/39 |
| 5,434,845 | * | 7/1995 | Miller | 370/252 |
| 5,519,689 | * | 5/1996 | Kim | 370/232 |
| 5,710,885 | * | 1/1998 | Bondi | 709/224 |
| 5,828,842 | * | 10/1998 | Sugauchi et al. | 709/223 |

\* cited by examiner

*Primary Examiner*—Viet D. Vu

(57) ABSTRACT

A method and apparatus for monitoring a communication link based on TCP/IP protocol obtains a protocol data unit (PDU) between communication systems. A emulation log is produced by analyzing the PDU in a PDU analysis part. An event sequence log is produced by estimating an event sequence of both communication systems based the emulation log in an event sequence estimation part. The behavior and the internal procedure of TCP is emulated by using the specific TCP state transition specification, internal variables of TCP, internal variables indicating the status and internal procedures in the TCP emulation part.

17 Claims, 10 Drawing Sheets

34 EMULATION LOG

| TCP SEGMENT TYPE | SOURCE | DESTINATION | TIME START | TIME END | UD LENGTH |
|---|---|---|---|---|---|
| SYN | A | C | 00:00.123 | 00:00.123 | 0 |
| SYN + ACK | C | A | 00:00.350 | 00:00.350 | 0 |
| ACK | A | C | 00:00.353 | 00:00.353 | 0 |
| DATA1 | A | C | 00:01.455 | 00:01.456 | 1460 |
| DATA2 | C | A | 00:01.566 | 00:01.567 | 1460 |

*FIG. 8*

| SYSTEM (C) EVENT SEQUENCE LOG | | |
|---|---|---|
| EVENT TYPE | TIME | UD LENGTH |
| SYNrecv | 00:00.209 | 0 |
| SYN+ACKsent | 00:00.246 | 0 |
| ACKrecv | 00:00.458 | 0 |
| DATA2sent | 00:01.277 | 1460 |
| DATA1recv | 00:01.745 | 1460 |

*FIG. 10*

| SYSTEM (A) EVENT SEQUENCE LOG | | |
|---|---|---|
| EVENT TYPE | TIME | UD LENGTH |
| SYNsent | 00:00.123 | 0 |
| SYN+ACKrev | 00:00.350 | 0 |
| ACKsent | 00:00.353 | 0 |
| DATA1sent | 00:01.455 | 1460 |
| DATA2recv | 00:01.567 | 1460 |

*FIG. 9*

SYSTEM (A) EVENT SEQUENCE LOG 45

| EVENT TYPE | SEQUENCE NUMBER (SEQ) | ACK NUMBER | WINDOW SIZE (WIN) | UD LENGTH |
|---|---|---|---|---|
| SYNsent | 1234 | — — | 8912 | 0 |
| SYN+ACKrecv | 4321 | 1235 | 8912 | 0 |
| ACKsent | 1235 | 4322 | 8912 | 0 |
| DATAsent | 1235 | 4322 | 8912 | 1460 |
| ACKrecv | 4322 | 2695 | 8912 | 0 |
| DATAsent | 2695 | 4322 | 8912 | 1460 |
| DATAsent | 4155 | 4322 | 8912 | 1460 |

METHOD AND APPARATUS FOR MONITORING A COMMUNICATION LINK BASED ON TCP/IP PROTOCOL BY EMULATING BEHAVIOR OF THE TCP PROTOCOL

FIELD OF THE INVENTION

This invention relates to a method and an apparatus for link-monitoring adaptive to the Internet. More specifically, this invention relates to a method and an apparatus for analyzing details of a telecommunication, from data flowing on a communication line, by emulating an inner procedure for a flow control in the TCP and by emulating a protocol behavior of the TCP based on a state transition of the protocol.

BACKGROUND DESCRIPTION

Recently, the TCP/IP is widely used in various computer communications as a result of a world-wide spread of the Internet. However, a great many users, who use a communication facility of the TCP/IP, do not have sufficient knowledge of details of a communication processing in the TCP/IP.

Herein, the TCP (Transmission Control Protocol) is a connection-oriented transmission control protocol for a transport layer and the IP (Internet Protocol) is a connectionless packet transfer protocol for a network layer. TCP and IP are major protocols used in the Internet.

In communication based on the TCP/IP, data throughput decreases when a loss of a packet occurs because of a congestion or a transmission error in a network, or when a parameter value such as a socket buffer size is different in two communication systems. In such cases, it is necessary to determine the cause of decreased throughput by analyzing details of the communication.

For inspecting a cause of decreasing throughput or, a protocol monitor is used to analyze a PDU (Protocol Data Unit) format and to display a result of the anaylsis. Further, an expert, who has a thorough knowledge of the details of the communication processing in the TCP/IP, analyzes a communication sequence by reading the result of the PDU format analysis.

The expert is necessary because the protocol monitor on the market does not have a function for analyzing a communication sequence and a function for inspecting a cause of throughput decreasing, while the protocol monitor has only a function for analyzing a PDU format and a function for displaying its result.

Therefor, it is difficult for the user who uses a communication facility of the TCP/IP to investigate a cause of decreasing throughput.

SUMMARY OF THE INVENTION

An object of the present invention is to provide a method adaptive to Internet link monitoring which is useful for investigating a cause of decreased throughput in communication based on the TCP/IP.

another object of the present invention is to provide an apparatus adaptive to Internet link monitor which is useful for investigating a cause of decreased throughput in communication based on the TCP/IP.

The present invention is a method adaptive to link monitoring that includes using an event sequence of a communication system which performs a communication based on TCP/IP protocol, a specification of TCP/IP state transition produced for TCP protocol specification, states and internal variables of TCP protocol, a status indicating what kind of internal procedure on a congestion control in TCP protocol is performed, and internal variables corresponding to internal procedures which include said internal procedure on a congestion control in TCP protocol;

emulating a behavior of TCP protocol based on a state transition and an internal procedure of TCP protocol; and analyzing details of the communication by using a result of said emulation.

The present invention is an apparatus adaptive to link monitoring comprising:

means for recording an event sequence of a communication system which performs a communication based on TCP/IP protocol;

means for recording a specification of TCP/IP state transition produced from TCP protocol specification;

means for recording status and internal variable s of TCP protocol, wherein the status indicates what kind of internal procedure in TCP protocol is performed; and means for analyzing details of the communication by emulating emulating a behavior of TCP protocol based on a state transition and an internal procedure of TCP protocol buy using said recorded information.

These and other objects of the present application will become more readily apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present application will become more fully understood from the detailed description and the accompanying drawings which are given by way of illustration only and wherein:

FIG. 8 shows an example of a content of an emulation log.

FIG. 9 shows an example of a content of an event sequence log regarding to a communication system (A).

FIG. 10 shows an example of a content of an event sequence log regarding to a communication system (C).

FIG. 13($b$) shows an example of an event sequence log regarding to a communication system (A).

DESCRIPTION OF THE PREFERRED EMBODIMENT

Referring to FIGS. 1~14, embodiments of the present invention will be explained.

First of all, an abstract of the TCP/IP is explained referring to FIGS. 1~5.

[Example of Network Configuration]

Figure 1:
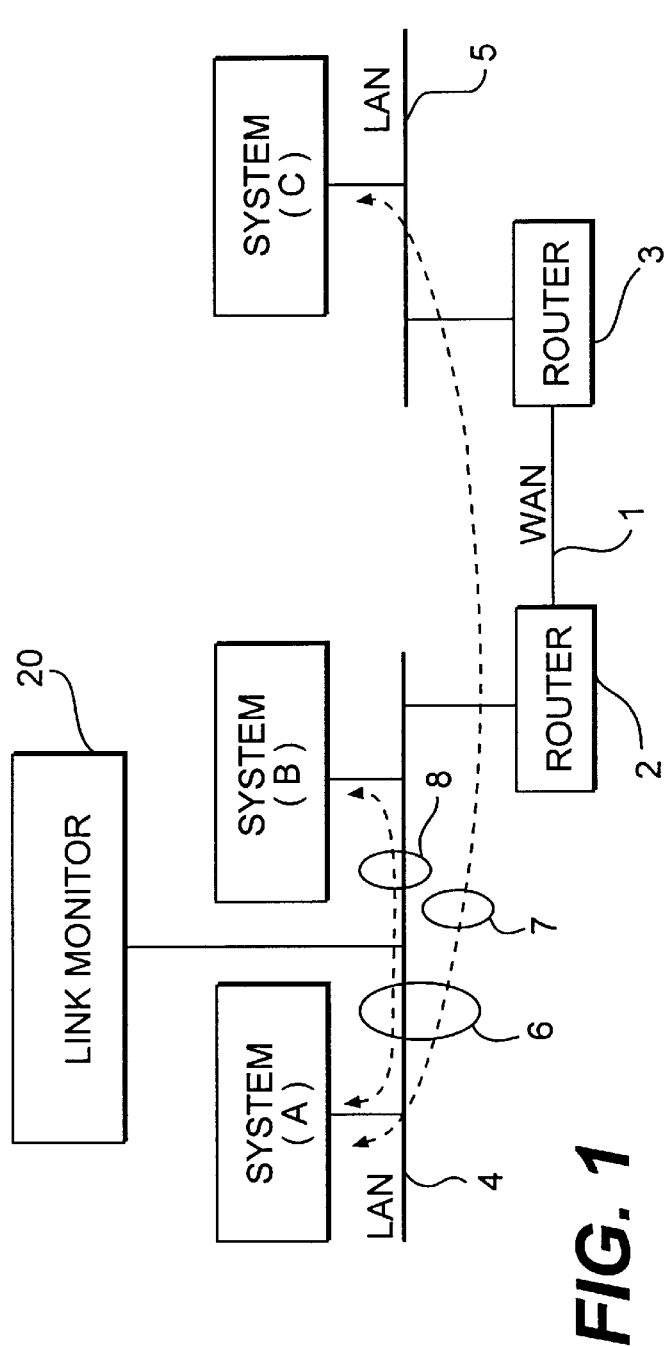
FIG. 1 shows an example of a network configuration and an example of a connection between a link monitor and a network.

FIG. 1 shows an example of network configuration and an example of a connection between a link monitor and a network. The network shown in FIG. 1 comprises a WAN (Wide Area Network) 1, a LAN (Local Area Network) 4 connected to the WAN 1 via a router 2, and a LAN 5 connected to the WAN 1 via a router 3. It is assumed that three communication systems (A), (B) and (C) are connected to the network as shown in FIG. 1. All of the system (A), (B) and (C) mutually communicate with each other according to the TCP/IP. Therefor, in this example, a PDU (Protocol Data Unit) the systems (A), (B) flows on the LAN 4 between, and a PDU between the systems (A), (C) also flows on same LAN 4. For example, an ISDN (Integrated Services Digital Network) is used as the WAN 1 and a Ethernet is used as the LANs 4, 5.

A link monitor 20 adaptive to the Internet is connected with the LAN 4 of the network for monitoring a PDU flowing thereon.

[Format of PDU]

Figure 2:
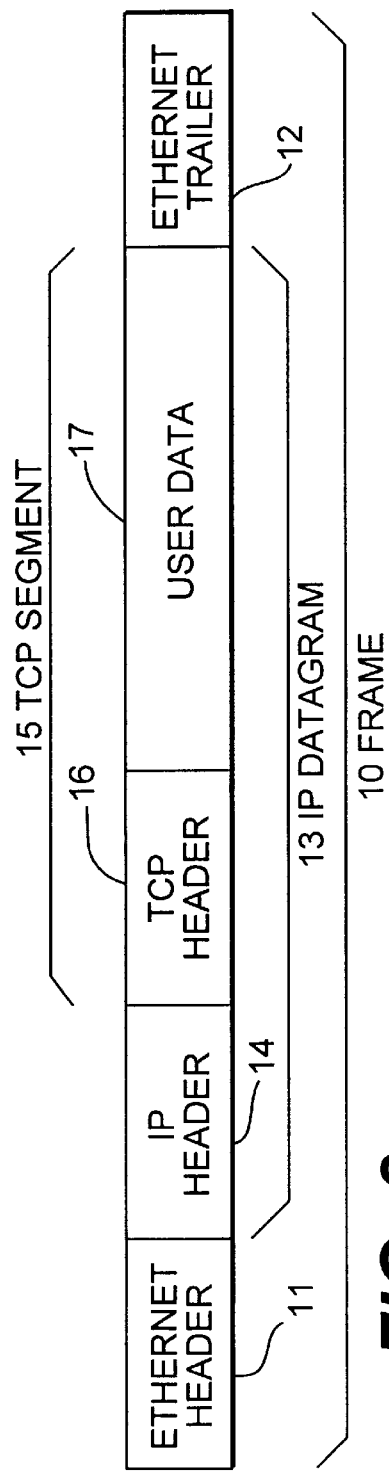
FIG. 2 shows a frame configuration in the Ethernet as an example of a PDU.

FIG. 2 shows a typical example of a PDU monitored by the link monitor 20. A PDU of a data-link layer is known as a frame 10.

As shown in FIG. 2, since an Ethernet is generally used as the LAN 4, the frame 10 comprises an IP datagram 13, an Ethernet header 11 added before the IP datagram 13 and an Ethernet trailer 12 added after the IP datagram 13. The IP datagram 13 comprises an IP header 14 and a TCP segment 15 added after the IP segment 14. The TCP segment 15 comprises a TCP header 16 and a user datagram 17 added after the TCP header 16. The user data 17, in this case, includes an application header. A length of the user datagram 17 is known as a UP length.

[IP Header]

Figure 3:
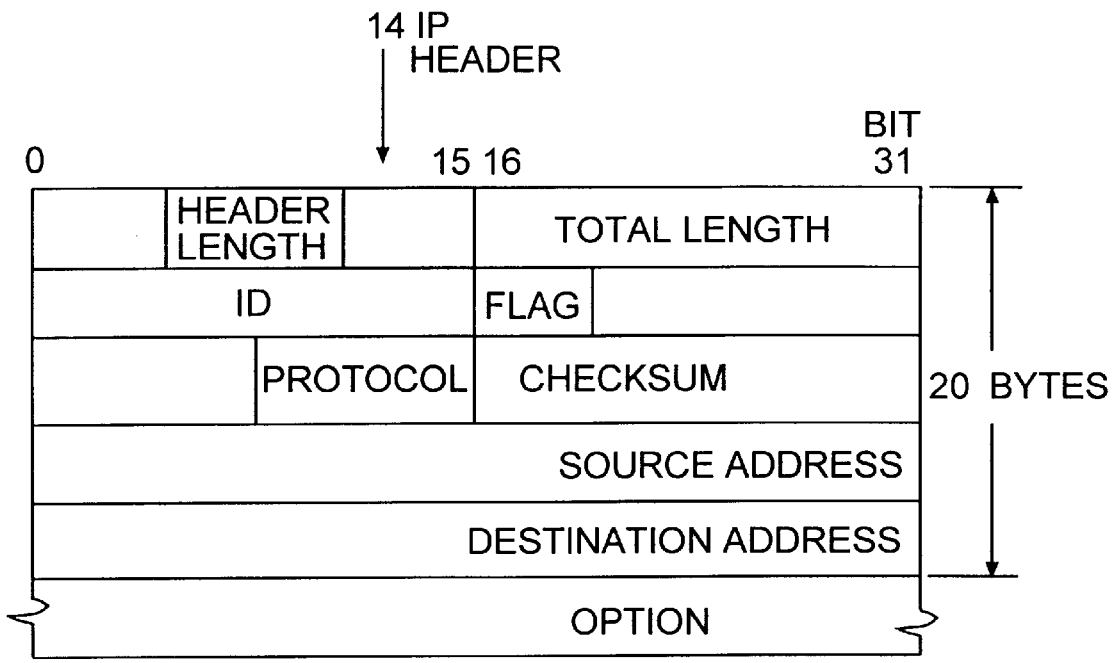
FIG. 3 shows a format of IP header.

FIG. 3 shows a typical format of the IP header 14. As shown in FIG. 3, the IP header 14 has a plurality of fields, for example, a field for a source address and a field for a destination address. A length of the IP header 14 is 20 bytes if not designated by an option.

[TCP Header and Flag]

Figure 4:
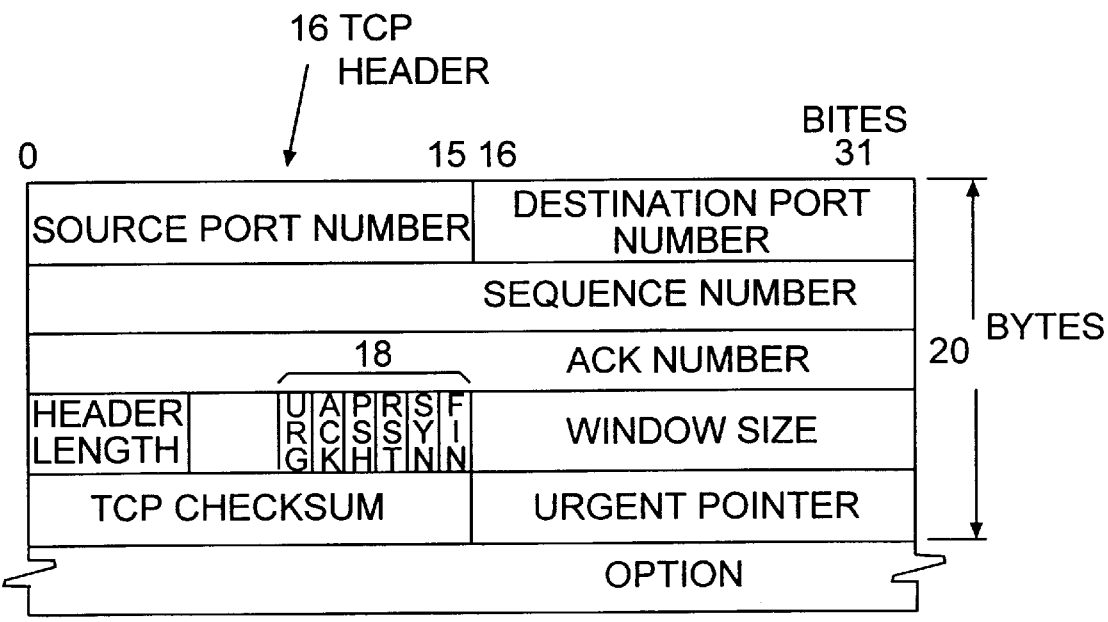
FIG. 4 shows a format of TCP header.

FIG. 4 shows a typical format of the TCP header 16. As shown in FIG. 4, the TCP header 16 has a plurality of fields, for example, a field for a source port number, a field for a destination port number, a field for a sequence number, a field for an ACK (ACKnowledgement) number, a field for a header length, a field 18 for control bits, a field for a window size, a field for a TCP checksum and a field for an urgent pointer. A length of the TCP header 16 is also 20 bytes if not designated by an option.

There are known six flag bits URG, ACK, PSH, RST, SYN and FIN as the control bits field 18 of the TCP header 16. Meanings of flag bit s are as follows.

(1) The flag bit URG indicates that an urgent pointer is valid.

(2) The flag bit ACK indicates that an ACK number is valid.

(3) The flag bit PSH indicates that a recipient must push a received data to an application as soon as possible.

(4) The flag bit RST resets a connection.

(5) The flag bit SYN synchronizes a sequence number to initialize a connection.

(6) The flag bit FIN indicates that a sender has finished a data transmission.

It is possible to set any one of flag bits to "ON" and also to set a plurality of flag bits to "ON". According to "On" of the flag bit of the TCP segment, there are known SYN segment, SYN+ACK segment, ACK segment, DT segment, FIN segment and RST segment. Meanings of these TCP segments are as follows.

(1) The segment SYN is such a TCP segment that only SYN bit is "ON" and ACK bit is "OFF". This segment is simply mentioned as SYN.

(2) The segment SYN+ACK is such a TCP segment that only SYN bit and ACK bit are "ON". This segment is simply mentioned as SYN+ACK.

(3) The segment ACK is such a TCP segment that only ACK bit is "ON" and no user data exists thereon. This segment is simply mentioned as ACK.

(4) The segment DT is such a TCP segment that only ACK bit is "ON" and user data exist thereon, in spite of "ON" or "OFF" of URG bit and RST bit. This segment is simply mentioned as DT.

(5) The segment FIN is such a TCP segment that FIN bit is "ON". ACK bit is "ON" in almost all FIN segments. This segment is simply mentioned as FIN.

(6) The segment RST is such a TCP segment that RST bit is "ON". ACK bit is "ON" in almost all RST segments. This segment is simply mentioned as RST.

There is known a duplicate ACK segment, of which ACK number is equal to an ACK number of another ACK segment, of which ACK number is equal to an ACK number of another ACK segment, of which length of TCP user data is zero and of which window has not been updated. The duplicate ACK segment is sent to a communication partner for giving a notice that a receiving system has not received data to be received. Further, there is known an ACK segment indicating window update, of which ACK number is equal to an ACK number of another ACK segment, of which length of TCP user data is zero and of which window has been updated. The window update ACK segment is sent to a communication partner for giving notice that a receiving system is ready to receive new data.

[event]

As events in the TCP protocol, there are known ten major events SYNsent, SYN+ACKsent, ACKsent, DT/ACKsent, FINsent, SYNrecv, SYN+ACKrecv, ACKrecv, DT/ACKrecv and FINrecv. Meanings of these events are as follows.

(1) The event SYNsent is a sent SYN segment.

(2) The event SYN+ACKsent is a sent SYN+ACK segment.

(3) The event ACKsent is a sent ACK segment.

(4) The event DT/ACKsent is a sent DT segment or a sent ACK segment.

(5) The event FIN sent is a sent FIN segment.

(6) The event SYNrecv is a received SYN segment.

(7) The event SYN+ACKrecv is a received SYN+ACK segment.

(8) The event ACKrecv is a received ACK segment.

(9) The event DT/ACKrecv is a received DT segment or a received ACK segment.

(10) The event FINrecv is a received FIN segment.

[State in the TCP protocol]

In the TCP protocol, a connection, which is identified by a source port number, a destination port number and an IP address on an IP header, is established between two communication systems by using SYN segment, SYN+ACK segment and ACK segment. In data transfer, a 32 bits sequence number and a 32 bits ACK number are used. A 16 bits window size, which is informed from a communication partner, is sued for a flow control. After data transfer, a connection is released by exchanging FIN segment and ACK segment between both systems.

Figure 5:
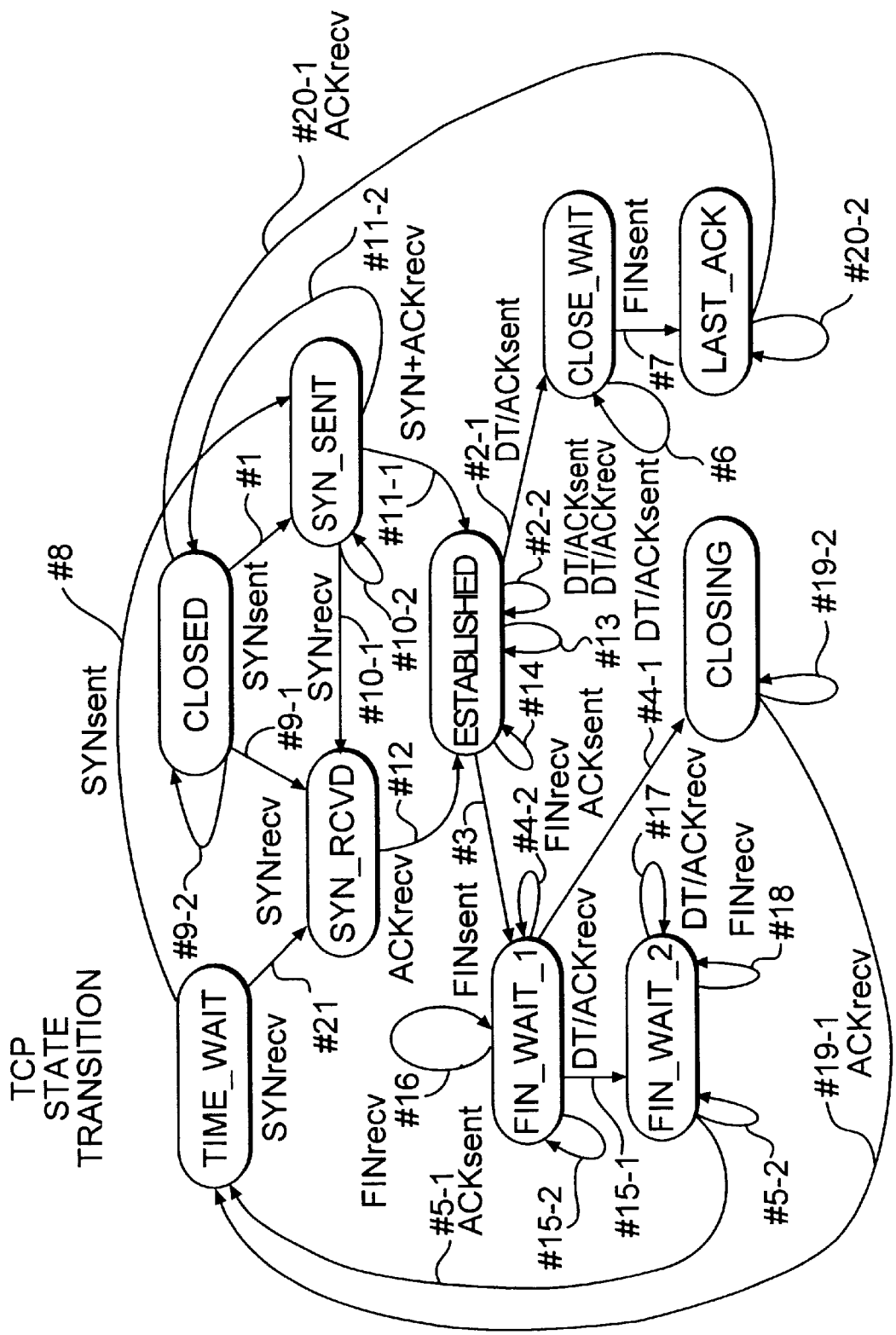
FIG. 5 shows a state transition of TCP.

As shown in FIG. 5, a state in the TCP protocol can take a value of CLOSED, SYN_SENT, SYN_RCVD, ESTABLISHED, FIN_WAIT_1, FIN_WAIT_2, CLOSING, CLOSE_WAIT, LAST_ACK or TIME_WAIT. Meanings of these values are as follows.

(1) The value CLOSED is such a state that no connection exists.

(2) The value SYN_SENT is such a state that a connection establishment is being processed after sending SYN segment.

(3) The value SYN_RCVD is such a state that the connection establishment is being processed after receiving SYN segment.

(4) The value ESTABLISHED is such a state that data transfers in both directions are available.

(5) The value FIN_WAIT_1 is such a state that a finish of data transmission is being requested.

(6) The value FIN_WAIT_2 is such a state that a finish of data transmission is completed.

(6) The value CLOSING is such a sate that data transmission and data reception are simultaneously finished.

(7) The value TIME_WAIT is such a state that a connection information, at a time when a connection release was completed, is maintained.

(8) The value CLOSE_WAIT is such a state that a connection release is being waited.

(9) The value LAST_ACK is such a state that a reception of a final ACK is being waited.

[Inner Parameter of TCP protocol]

In the TCP protocol, there are internal parameters on a sending sequence, internal parameters on a receiving sequence and internal parameters corresponding to an internal procedure of a flow control to avoid a congestion.

[Inner Parameter on Sending Sequence]

As internal parameters on a sending sequence, there are parameters snd_nxt, snd_wnd, iss, mss, snd_max and finrecv_flag. The parameters snd_max and finrecv_flag are necessary for an implementation and for a procedure as a monitor. Meanings of these parameters are as follows.

(1) The internal parameter_nx: is a sequence number to be sent in the next time.

(2) The internal parameter snd_una is a minimum sequence number which was sent but has not been acknowledged.

(3) The internal parameter snd_wnd is a window size of a sender.

(4) The internal parameter iss is an initial sending sequence number.

(5) The internal parameter mss is a maximum segment size.

(6) The internal parameter snd_max is a maximum sending sequence number which was sent in the past.

(7) The internal parameter finrecv_flag is a flag for indicating that a reception of FIN has already been done.

[Internal Parameter on Receiving Sequence]

As internal parameters on a receiving sequence, there are parameters rcv_nxt, rcv_wnd, irs, rcv_una and finrecv_flag. These parameters rcv_una and finrecv_flag are necessary for implementation and for a procedure as a monitor. Meanings of these parameters are as follows.

(1) The internal parameter rcv_nxt is a sequence number to be received in the next time.

(2) The internal parameter rcv_wnd is a window size of a receiving side.

(3) The internal parameter irs is an initial receiving sequence number.

(4) The internal parameter snd_una is a minimum receiving sequence number which was received but has not ben acknowledged.

(5) The finrecv_flag is a flag indicating that a reception of FIN has already been done.

[Internal Procedure of Flow Control for Congestion Avoidance]

The TCP/IP provides a reliable data transfer service on the IP protocol of a network layer. Then, there is a original flow control in the TCP to avoid a congestion of a network. For the original flow control the, following four internal procedures (1)~(4) are implemented in the TCP protocol.

(1) slow start (2) congestion avoidance (3) fast retransmit ((4) fast recovery

Basic policies of the above-mentioned four internal procedures are as follows.

(1) In a case that a network with a low physical line speed exists between a sending communication system and a receiving communication system, a missing-TCP segment will occur based on a congestion of the network. Therefor, congestion is avoided by controlling a sending speed, by means of two parameters cwnd (congestion window) and ssthresh (slow start threshold), inside a sender.

(2) Especially, for improving throughput in a communication system of which window size is large, the sender judges, by receiving plurality of duplicate ACK segment, that a TCP segment was lost. Then, the sender retransmits the missing-TCP segment.

The above-mentioned internal procedures obey the following procedures (i)~(iv).

(i) The sender cannot send data which is larger than a present window, wherein the present window is a lower amount among a congestion window cwnd and a advertised window which was notified from a receiving side.

(ii) A congestion is detected by a time-out or receiving a plurality of the duplicate ACK segments. In a case that a congestion was detected by a time-out, the sender sets a half of the present window as the slow start threshold parameter ssthresh and sets one segment (the maximum segment size) as the congestion window parameter cwnd, then retransmits the TCP segment.

(iii) In a case of receiving duplicate ACK segments, the sender judges that an already sent TCP segment was lost. As a result, the sender sets a half of the present window as the slow start threshold parameter ssthresh, then retransmits the TCP segment. After the retransmission, when the sender receives an ACK segment corresponding to a receipt of the new data, the sender sets the congestion window parameter cwnd to the slow start threshold parameter ssthresh.

(iv) In a case of receiving an ACK segment corresponding to a receipt of the new data, if the congestion window parameter cwnd is larger than the the slow start threshold parameter ssthresh, the sender carries out the slow start procedure and increases the congestion window parameter cwnd by one segment at every ACK reception. In this case, the congestion window parameter cwnd is exponentially increased against a going and returning time. If the congestion window parameter cwnd is equal to or smaller than the the slow start threshold parameter ssthresh, the sender carries out the congestion avoidance procedure and linearly increases the congestion window parameter cwnd.

[Internal Variables corresponding to Internal Procedures for Congestion Avoidance]

Therefor, as internal variables corresponding to internal procedures for a congestion avoidance, there are internal variables status cwnd, ssthresh, dupacks in the TCP protocol. Meanings of these internal variables are as follows.

(1) The internal variable status is a variable indicating a internal procedure being carried out at present. A value of the internal variable status is one of SS, CA, FR and NORMAL.

(2) The value SS is a value indicating the internal procedure slow start.

(3) The value CA is a value indicating the internal procedure congestion avoidance.

(4) The value FR is a value indicting one of the internal procedures fast transmit and fast recovery.

(5) The internal variable cwnd is a variable indicating the congestion window.

(6) The internal variable ssthresh is a variable indicating the threshold in the slow start.

(7) The internal variable dupacks is a number of continuously received duplicate ACK segments.

[Abstract of Link Monitor]

An abstract of the link monitor 20 will next be explained. To analyze details of a communication based on TCP/IP, a facility, which emulates a behavior of a communication system according to TCP, is necessary in addition to a monitoring facility similar to the protocol monitor on the markect.

The inventors developed as disclosed in Japanese patent Application No. 6-223138 (Japanese Laid-Open Patent Application No. 8-88672), a link monitor adaptive to OSI (Open Systems Interconnection) for detecting a protocol error by analyzing the OSI protocol.

Basically it is possible to emulate a behavior of a communication system according to TCP by analyzing TCP protocol behavior in the same manner of above-mentioned link monitor adaptive to OSI.

However, TCP has an internal procedure which is determined as a local independent procedure in OSI protocol, for example, above-mentioned slow start or congestion avoidance etc. Namely, a TCP protocol specification includes an internal procedure by which a sender controls an amount of data to be sent to a network for avoiding a congestion in the network.
ernet to implement a more complex protocl emulation facility than the link monitor adaptive to OSI.

[Required Condition]

The link monitor 20 of the present embodiment satisfies the following conditions (1)~(6).

(1) Because TCP/IP is sued on a high speed network such as a LAN, a PDU flowing on the network is obtained by online processing while details of a communication are analyzed by offline processing.

(2) A communication based on TCP/IP is inspected form the point of view that formats of all PDU flowing on a network are analyzed and that a communication situation between specific communication systems is analyzed. Namely, it is necessary to analyze above-mentioned object of TCP because TCP is the most complex protocol among TCP/IP protocols.

(3) In the analysis of above-mentioned PDU formats of all PDU flowing on a network, one PDU flowing the network is treated as an input or receiving event and also an output or sending event against two communication systems.

(4) IN the analysis of above-mentioned communication situation between specific communication systems, a TCP protocol behavior in a communication system is emulated by using a sequence of TCP segments. The emulation is independently carried out about every communication system.

(5) TCP protocol for emulation is basically implemented with such an internal procedure as slow start, congestion avoidance etc. However, these internal procedures were recently added to the TCP specification. Then, these internal procedures are not always implemented in software on the market. Therefor, the link monitor 20 of the present embodiment has a facility for emulating these internal procedures and also a facility for estimating a possibility that these internal procedures are not implemented. Hereinafter, TCP protocol with the above-mentioned internal procedure is called Modern-TCP, and TCP protocol without the above-mentioned internal procedure is called Original-TCP.

(6) It is considered to monitor a communication connected via WAN, for example ISDN. In this case, an emulation is carried out by considering a time difference between a time at which a certain PDU is actually processed by a communication system and a time at which the PDU is detected by the link monitor 20.

[Concrete Design for Link Monitor]

As shown in FIG. 1, the link monitor 20 of the present embodiment has a PDU monitoring facility for analyzing a PDU format in all communications 6 according to TCP/IP on the LAN 4, and a TCP emulation facility for estimating a TCP protocol behavior in specific communications 7, 8 between a specific pair of communication systems.

The PDU monitoring facility of the link monitor is almost the same as a facility of a protocol analyzer on the market. As the PDU monitoring facility, a PDU on the LAN 4 is captured, then its PDU format or its parameters is analyzed based on various protocols, for example, ARP, IP, UDP, TCP.

The TCP emulation facility is implemented by the following procedures (1)(2).

(1) An event sequence in each communication system is estimated by considering a time difference between a time at which the link monitor 20 detects a certain PDU and a time at which a communication system actually processes the PDU. Namely, it is impossible to ignore the time difference in a case that two communication systems (A)(C) exist on different LANs 4, 5 via WAN 1 as shown in FIG. 1, while it is possible to ignore the time difference in a case that two communication systems (A) (B) exist on same LAN 4 with which the link monitor 20 is connected as shown FIG. 1. Therefor, an event sequence in each communication system is estimated.

(2) Next, TCP protocol behavior in each communication system is emulated based on the estimated event sequence.

Figure 6:
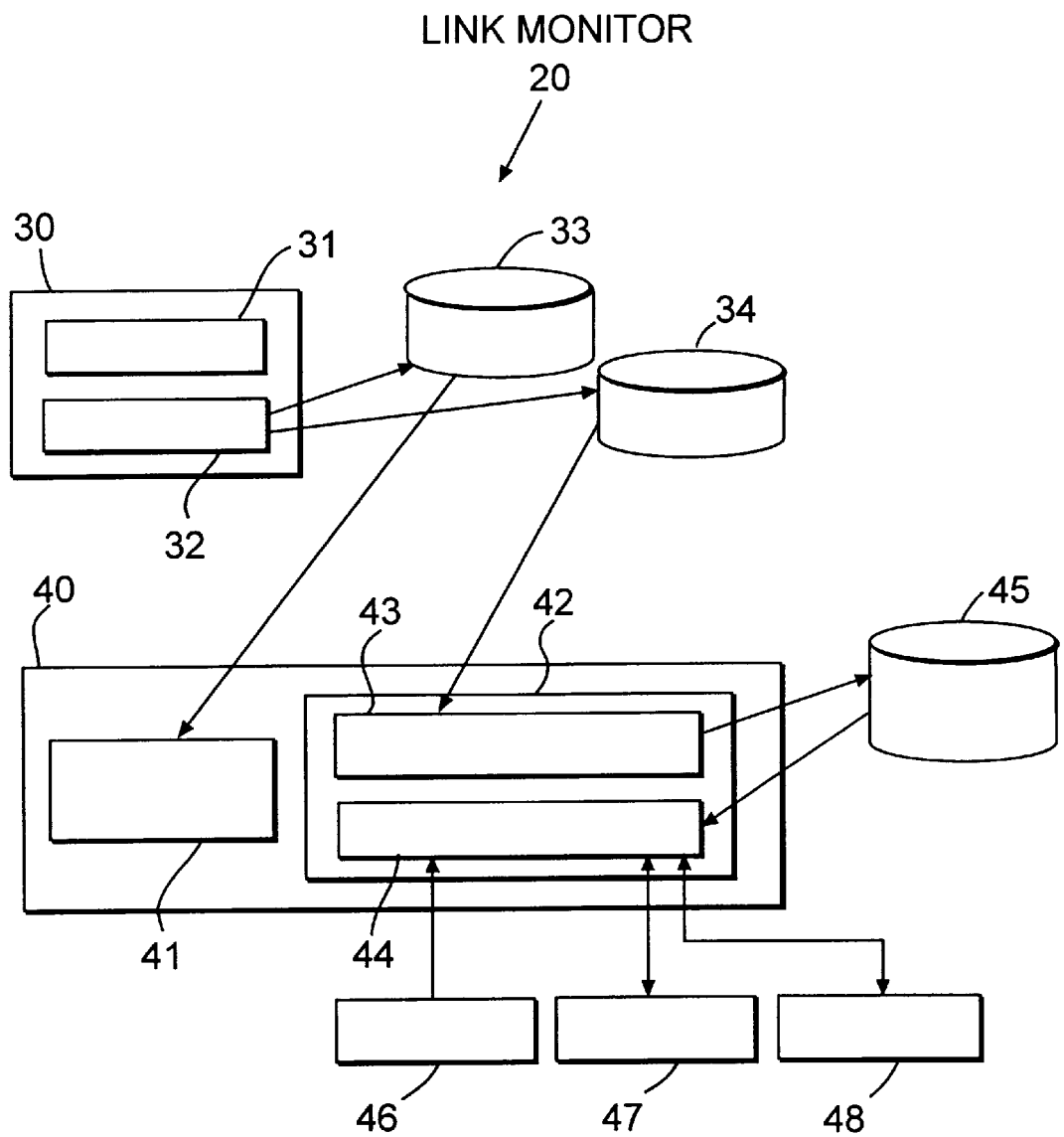
FIG. 6 shows an example of a configuration of a link monitor.
Figure 7:
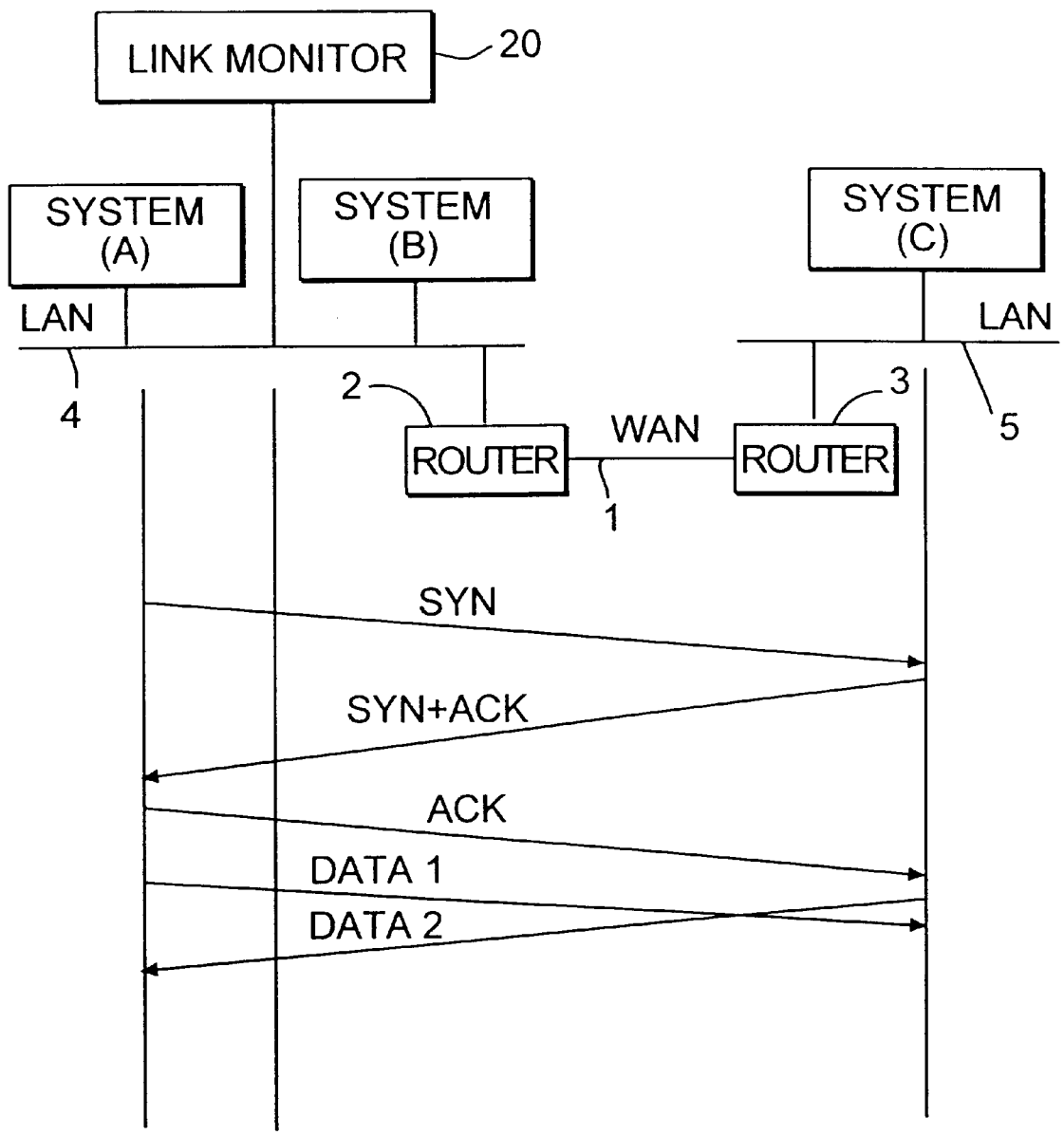
FIG. 7 shows an example of an event sequence.

The link monitor 20 is obtained by implementing its facility as a software on a UNIX work-station. Concretely, as shown in FIG. 6, the link monitor 20 comprises a part 30 for online processing and a part 40 for offline processing. The online processing part 40 includes a frame getting part 31 for getting a frame flowing on the LAN 4 and a PDU analyzing part 32 for analyzing PDU format and its parameter based on TCP. In the PDU analyzing part 32, a result of the analysis is stored on a monitor log 33, and an information, which is used by a TCP behavior emulation part 42 in the offline processing part 40, is recorded on an emulation log 34.

The offline processing part 40 includes a part 41 and a part 42. The part 41, which is called as a PDU monitoring result and inspection part, provides a facility for displaying information stored in the monitor log 33. The part 42, which is called as a TCP behavior emulation part, includes a part 43 for estimating an event sequence and a part 44 for emulating TCP. The event sequence estimation part 43 makes an event sequence of each communication system but its details will be explained later. The TCP emulation part 44 emulates TCP protocol behavior based on the event sequence but its details will be explained later. As shown FIGS. 9, 10, the event sequence includes a sending event and a receiving event, which are events against TCP protocol, and a time at which the event is processed.

The TCP emulation part 44 has a specification 46 of TCP state transition. The TCP state transition specification 46 is originally defined in the present invention by using the TCP protocol specification. The basic definition of the TCP state transition specification 46 is as follows (1)(2).

(1) In processing a sending event, by prescribing a PDU which can be sent at each state and by prescribing a parameter of a send PDU, at least one of the state and the internal variable after processing the sending event is defined.

(2) In processing a receiving event, one of the state and the internal variable after processing the receiving event is defined at every parameter of the receiving event or at every present state and internal variable. Further, if there is a sending event to be expected as a response, by prescribing a parameter of its send PDU, at least one of the state and the internal variable after processing the sending event is defined.

The TCP emulation part 44 basically carries out the following procedures (1) and (2) responding to a receiving event by using the TCP state transition specification 46.

(1) In a case of processing the receiving event, the part 44 searches a sending event, which is thought as a response to the receiving event, out of an event sequence just after the receiving event. The part 44 carries out a state transition suitable to TCP protocol from a set of the receiving event and the sending event. Namely, by extracting a sending event to be a response to the receiving event and by judging whether the state transition is truly possible or not based on searching the TCP state transition specification 46, if possible and the sending event is processed, a state and an internal variable, after processing the sending event, are estimated. If possible but the sending event is not processed, a state and an internal variable, after processing the receiving event, are estimated.

(2) In a case of processing the sending event, the event is processed at every present state. Namely, in the present state, a transition, which sends the sending event, is searched from the TCP state transition specification 46, then the transition is carried out. If it is impossible to send the sending event, it is considered that a protocol error occurred. In other words, by judging whether the transmission of the sending event is truly possible or not based on searching the TCP state transition specification 46, if possible, a state and an internal variable, after processing the sending event, are estimated. If possible and the sending event is processed, a state and an internal variable, after processing the sending event, are estimated. If possible but the sending event is not processed, a state and an internal variable, after processing the receiving event, are estimated.

[Generation of Emulation Log]

The PDU analysis part 32 in the online processing part 30 analyzes formats of all TCP segments obtained, then records various information shown as the following (i)~(v), as the emulation log 34, from a result of the analysis. This information is used in the TCP behavior emulation part 42 in the offline processing part 40. A sample of the emulation log 34 is shown in FIG. 8.

(i) a time at which a starting point and an ending point of a TCP segment are detected (ii) a source IP address and a destination address in the header 14 shown in FIG. 3

(iii) parameters of TCP header except for checksum, for example, a source port number, a destination port number, a sequence number, an ACK number, a window size etc. in the TCP header 16 shown in FIG. 4

(iv) a TCP user data length (v) a flag indicating whether a checksum is right or not However, out of the detected times of the starting point and the ending point, only the detected time of the ending point of the frame is measured. The time of the starting point of the TCP segment, as mentioned after, is calculated by subtracting a frame transfer time in proportion to a frame length from the detected time of the ending point of the frame.

[Estimation of Event Sequence]

An event sequence is estimated about every pair of IP addresses, indicating a pair of communication systems, by the event sequence estimation part 43 of the TCP behavior emulation part 42. An actual TCP emulation is carried out by the TCP emulation part 44.

The event sequence estimation part 43 estimates an event sequence by using the emulation log 34, then makes the event sequence log 45 for each communication system by changing the observed TCP segments to an order of an actual processing time of an event at every communication system. Namely, regarding to a treatment of a sending event and a receiving event, a time, at which the communication system actually sends or receives the event, is estimated by using a time at which the link monitor 20 obtains a PDU in consideration of a length of the PDU and a relation of a physical position between the link monitor 20 and each communication system.

The following (1)~(3) indicate a concrete operation for estimating the event sequence between the communication systems (A) and (B).

(1) The event sequence estimation part 43 successively extracts an information according to a TCP segment, which was received or sent by the communication systems (A) and (B) respectively, from the emulation log 34.

(2) In the case of extracting a TCP segment from the communication system (A) to the communication system (B), is judged that a sending event occurred in the communication system (A) and a receiving event occurred in the communication system (B). Conversely, in the case of extracting a TCP segment from the communication system (B) to the communication system (A), is judged that a sending event occurred in the communication system (B) and a receiving event occurred in the communication system (A).

(3) An event processing time in each communication system is estimated. The event processing time, in a case of a sending event, is calculated by subtracting a frame transfer delay time between the link monitor 20 and the communication system from the time of the frame ending point. The event processing time, in a case of a receiving event, is calculated by adding a frame transfer delay time between the link monitor 20 and the communication system to the time of the frame ending point. The frame transfer delay time is a sum of a transmission delay and a frame transfer time in proportion to the frame length.

FIGS. 7 to 10 show a sample of the event sequence estimation between two communication systems (A) and (B) respectively connected with the LANs 4, 5 via the WAN 1. FIG. 8 shows a content of the emulation log 43 recorded by the PDU analysis part 32. FIG. 9 shows a content of the event sequence log 45 regarding to the communication system (A). FIG. 10 shows a content of the event sequence log 45 regarding to the communication system (C).

In above-mentioned example, the event sequence of the communication system (A) is equal to an order monitored by the link monitor 20 and shown in FIG. 8 because of a small transmission delay between the link monitor 20 and the communication system (A) respectively on the same LAN 4.

However, the event sequence of the communication system (A) is different from an order of a data receiving event DATArecv and a data sending event DATA2sent monitored by the link monitor 20 because of a large transmission delay between the link monitor 20 and the communication system (C) on other LAN 5. Therefor, it is necessary to estimate the event sequence and to change the order.

For example, the event processing time of a data receiving event DATArecv in the communication system is calculated as follows, wherein a transmission delay of the WAN is 100 ms. a transmission speed of ISDN is 64 Kbps and the LANs 4, 5 are Ethernet of 10 Mbps transmission speed.

About 188 ms(=1460+40)*8/6400) is necessary to transmit a TCP segment from the LAN 4 to the router 3 via the WAN (ISDN) 1. About 1 ms=((1460+40)*8/1000000) is necessary to transmit the TCP segment from the router 4 to the communication system (C). a frame length is a sum of a UP length (TCP user data length) and IP header size and TCP header size. The amount 1460 is a UP length (bytes) of a TCP segment DATA1, and 40 is a sum (bytes) of IP header and TCP header.

Therefor, the event processing time of the data receiving event DATA1recv is estimated as 0:01.745=00:01.456 (monitored time by link monitor 20)÷0.100 (transmission delay)÷0.188 (frame transfer time in WAN1)+0.001(frame transfer time in LAN3).

[Details of TCP Emulation]
Next, details of TCP emulation will be explained.
[Original TCP Behavior]
In the original TCP, a connection, which is identified by the source port number, the destination port number an IP address on the IP header, is established by three kind of TCP segments SYN, SYN+ACK and ACK. After a connection establishment, a data transfer is performed by using a sequence number and an ACK number. In the data transfer, a flow control is performed by using a window size noticed from a partner communication system. When the data transfer is finished, the connection is released by exchanging two kind of TCP segments FIN and ACK between both communication systems.

[Internal Procedure of Modern TCP]
In addition to the facilities of the original TCP, the modern TCP is implemented with above-mentioned four internal procedures slow start, congestion avoidance, fast retransmit and fast recovery for controlling a congestion. A flow control of the modern TCP is carried out by using these internal procedures.

[Policy of TCP emulation]
The TCP emulation part 44 emulates both behaviors of original TCP and Modern TCP in every TCP connection. In this case, the sending event and the receiving event are processed according to an order of a time at which the event has occurred. Then, the state and the internal variable are estimated at any time triggered by the event processing.

For responding to a behavior of the original TCP, the TCP emulation part 44 has a state and internal variables respectively defined by RFC (Request for Comment of the Internet). Further, the TCP emulation part 44 has an internal variable which is not defined by RFC but necessary for implementation and an internal variable which is not defined by RFC but necessary for a link monitor.

The state defined by RFC can obtain the following values as mentioned above.

CLOSED;
SYN_SENT;
SYN_RCVD;
ESTABLISHED;
FIN_WAIT_1;
FIN_WAIT_2;
CLOSING;
CLOSE_WAIT;
LAST_ACK; and
TIME_WAIT As mentioned above, the internal variables defined by RFC are indicated below.

snd_nxt;
snd_una;
snd_wnd;
iss;
mss;
rcv_nxt;
rcv_wnd; and
irs

Further as mentioned above, the internal variables necessary for implementation or a link monitor are indicated below.

snd_max;
rcv_una; and
finrecv_flag

For corresponding to a behavior of the modern TCP, the TCP emulation part 44 estimates an internal procedure on a congestion control in TCP by taking an opportunity of a sending or receiving event processing. For example, an occurrence of the internal procedure slow start is detected at a time when a connection is established (namely, the sending event SYN or SYN+ACK is processed) or at a time when a data retransmit occurs by a time out (namely, the sending event DT is processed).

In detail, the TCP emulation part 44 judges an occurrence of the congestion control in TCP, an end of the congestion control and a value of an internal variable used in the control, by taking an opportunity of a sending event processing or a receiving event processing. On the procedure slow start, an occurrence of slow start is judged by taking an opportunity of a time out retransmit (namely, a DT retransmit of which sequence number is smaller than a sequence number of data to be next transmitted), then a value of its internal variable at every DU transmission or ACK reception. On the procedures fast retransmit and fast recovery, their occurrences are judged by taking an opportunity of three duplicate ACK segments. Further, the TCP emulation part 44 estimates a status (slow start, congestion avoidance, fast retransmit, fast recovery or NORMAL) which indicates a present internal procedure for a congestion control. As internal variables adaptive to the internal procedure of the modern TCP, the TCP emulation part 44 has a status for indicating what kind of internal procedure is performing, and internal variables used by each internal procedure.

As mentioned above, there the following internal variables corresponding to the internal procedures.

(1) status: one of the values SS (slow start), CA (congestion avoidance), FR (fast retransmit and fast recovery) and NORMAL;

(2) cwnd: a value of congestion window;

(3) ssthresh: a value of slow start threshold;

(4) dupacks: a number of sequentially received duplicate ACK segments

The TCP emulation part 44 has the TCP state transition specification 46; the state and internal variables 47 which include the internal variables defined by RFC for corresponding to the original TCP and the internal variables not defined by RFC but necessary for an implement or a link monitor; and internal variables 48 which include the status indicating the internal procedure in the modern TCP and internal variables used by teach internal variable.

FIG. 5 shows a state transition in a connection establishment phase and a data transfer phase etc. The TCP emulation part 44 emulates a transition of the state or the internal variable at every event. For example, in the case that the present state is a CLOSED and the sending event SYNsent is processed, the state transits from closed to SYN_SENT by processing the transition #1 shown in FIG. 5.

An algorithm of the TCP emulation will be explained.

[Main Processing of TCP Emulation]

The TCP emulation part 44 performs a main processing as follows, based on the flow chart shown in FIG. 11.

(1) First, in the step S1, an event is successively extracted from the event sequence log.

(2) Next, in the step S2, it is judged whether the extracted event is a sending event or a receiving event.

(3) If the extracted event in the step S1 is the sending event, an executable transition is searched, in the step S3, based on the TCP state transition specification for the emulation.

(4) If the search of the executable transition results in success (: TRUE) in the step S3, the transition including a renewal of the state or the internal variable is performed in the step S4.

(5) If the search of the executable transition results in failure (: FALSE) in the step S3, a protocol error is assumed in the step S5.

(6) If the extracted event in the step S1 is the receiving event, a sending event, which has not processed and a first sending event after the extracted receiving event, is extracted from the event sequence log in the step S6.

(7) By assuming that the extracted sending event in the step S6 is a response to the receiving event, its transition is searched in the step S7. In FIG. 11, the mark FALSE indicates a failure of the search. In the case of success of the search, the mark TRUE_ON indicates that the sending event has been processed and the mark TRUE_OF indicates that the sending event has not been processed.

(8) If the search of the executable transition results in failure (: FALSE) in the step S7, it is assumed, in the step S5, that the receiving event was lost.

(9) If the search of the executable transition results in success and the sending event has been processed (:TRUE_ON) in the step S7, it is recorded in the sending event of the event sequence, in the step S0, that the sending event has processed, then the transition including a renewal of the state or the internal variable is performed in the step S4.

(10) If the search of the executable transition results in success but the sending event has not been processed (:TURE_OFF) in the step S7, the transition including a renewal of the state or the internal variable is performed in the step S4.

EXAMPLE 1 OF EMULATION

Next, referring to the transition *1, *4, *6 and *9 shown in FIG. 12, details of transition search at every sending event and details of transition search at every pair of a receiving event and a sending event will be explained.

Figure 11:
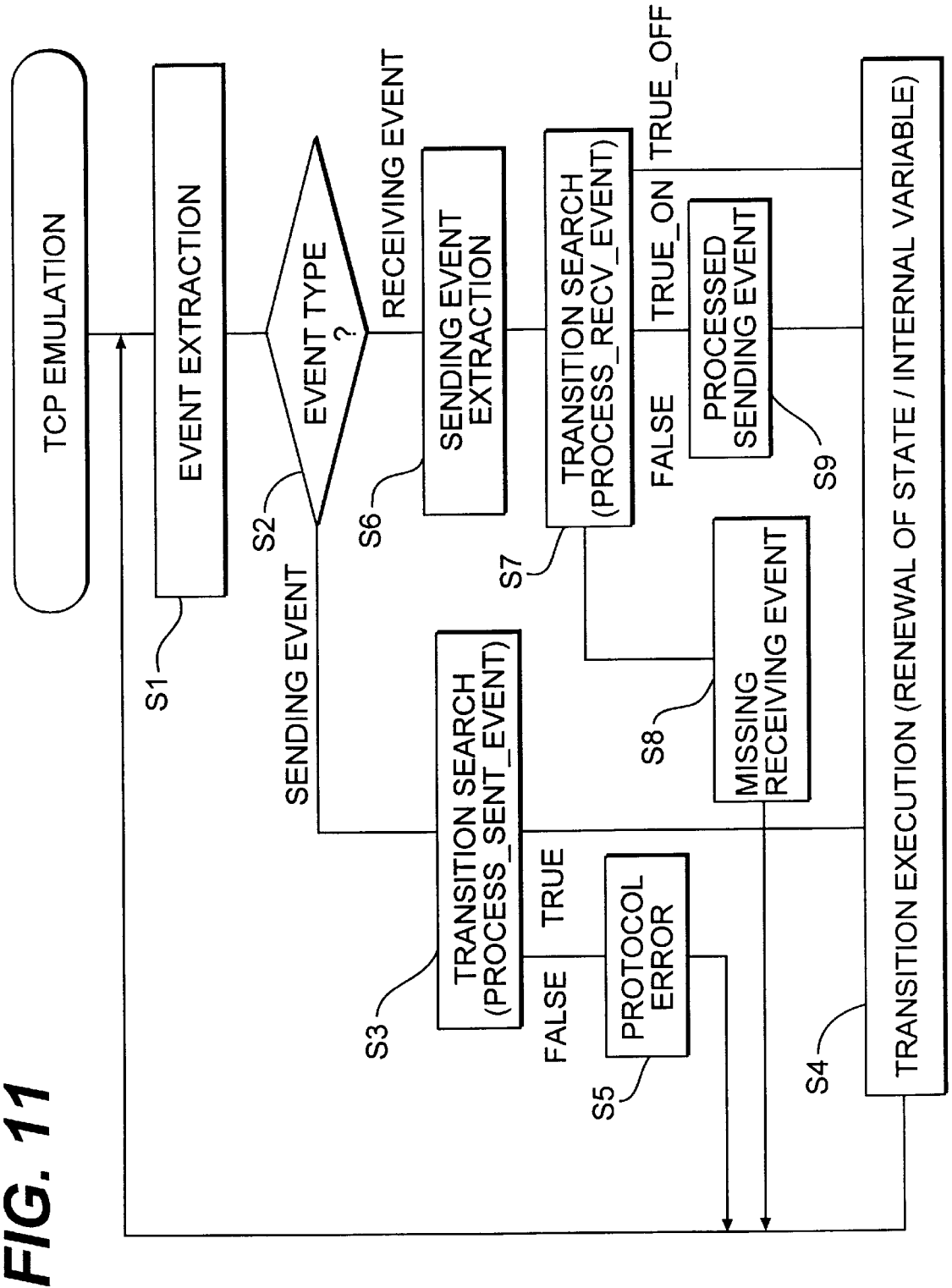
FIG. 11 is a flow chart showing a processing of a TCP simulation part.

The sending event processing in the step S3 and the receiving event processing in the step S7 Respectively shown in FIG. 11 are described below by using function expressions which are written by C computer program language.

[Function Expression for State Transition Search of Sending Event]

The list 1 described below is a function expression for the state transition search processing based on the sending event. This is a process_sent_event(sent_evt). The mark TRUE is a return value indicating a success of a transition search and the mark FALSE is a return value indicating a failure of a transition search.

[List 1]

```
process_sent_event(sent_evt) {
    switch(state) {
    case CLOSED:
        switch (sent_evt) {
            case SYNsent:              ---- transitions *1
                iss=SSEG. SEQ; snd_una=iss; snd_nxt=iss+1;
                rcv_wnd=SSEG. WND; snd_max= snd_nxt;
                cwnd=mss; ss thresh=655335;
                state=SYN_SENT; status=SS; return(TRUE);
        (note)SSEG. SEQ indicates a sequence number of a sending event,
            SSEG. WND indicates a window size of a sending event.

}
        .
        .
        .
    case ESTABLISHED:
        switch (sent_evt) {
            case DATAsent:             ---- transitions *6
        if(data sending larger than MSS, data sending over a window etc.)
                {
            [protocol error processing (return(FALSE))];
        } else  {         /*true data*/
            if (SSEG. SEQ== snd_next) {
            if (status!=NORMAL && snd_nxt+SSEG. LEN > snd_una
            +cwnd) [infringement of slow start,
            estimation of the internal procedure is stopped
                (status=NORMAL)];
                snd_nxt+=SSEG. LEN:
        (note)SSEG. LEN indicates a TCP user data length
```

-continued
```
       of a sending event.
       if (SSEG. SEQ== snd_max) snd_max= snd_nxt;
    } else {
       /* data retransmit (SSEG. SEQ!=snd_nxt)*/
       ssthresh=max(2*mss, min(cwnd, snd_wnd)/2);
       cwnd=mss; status=SS;
    }
    return(TRUE);
  }
    .
    .
    .
}
```

[Function Expression for State Transition Search of Receiving Event]

The list 2 described below is a function expression for the state transition search processing based on the receiving event. This is a process_recv_event(recv_evt, sent_evt). The mark TRUE_ON is a return value indicating a success of a transition search in the case that the sending event has been processed, the mark TRUE_OFF is a return value indicating a success of a transition search in the case that the sending event has not been processed and the mark FALSE is a return value indicating a failure of a transition search.

[List 2]

```
process_recv_event(tbl,recv_evt,sent_evt) {
   switch(state)  {
      .
      .
      case SYN_SENT:
         if( receiving event has an unexpected ACK number
             or RST bit is ON or SYN bit is OFF) }
            .
                            /*omission*/
         } else {   /*correct SYN+ACK */
            if (sending event is ACK)&& (it is satisfied a condition
                 that parameter of sending event is a confirmation to ))
            }                                  ----transition *4
               irs=RSEG.SEQ; snd_una=RSEG.ACK;
               rcv_nxt=irs+1; rcv_wnd=SSEG.WND;
               rcv_una=SSEG.ACK; snd_wnd=RSEG.WND;
               state=ESTABLISHED; return(TRUE_ON);
               /*receiving/sending event were correctly processed*/
   (note) SSEG.ACK indicates an ACK number of sending event.
            } else {
               return(FALSE);/*judged as loss of reception*/
            }
         }
      .
      .
      case ESTABLISHED:
         if (RSEG.ACK== snd_una) {
            if (condition that receiving event is not duplicate ACK)
               dupacks=0;
   (note) RSEG.ACK indicates an ACK number of receiving event.
            else {          /*duplicate ACK*
               if (++dupacks>=3)  {
                  if (status!=FR) {
                     if (date retransmit based on fast retransmit is
                         correctly performed as sending event.)  {
                  /* fast retransmit is emulated.*/
                         ssthresh=max(2*mss, min(snd_wnd,cwnd)/2);
                         cwnd=ssthresh+3*mss; status=FR:
                         return( TRUE_ON):
                     } else {return(FALSE);}
                  } else cwnd+=mss;
                  /* cwnd is increased by 1mss during fast retransmit*/
               }
            }
         } else if (RSEG.ACK> snd_una && RSEG.ACK< snd_max)
```

```
      } /*new ACK number*/                      ----transition *9
         switch(status) {
         case SS:
            cwnd+=mss;
            if (cwnd>65535) {
               status=NORNAL; cwnd=65535;
            }
            else if (cwnd>ssthresh) status=CA;
            break;
         case CA:
            cnwd+=mss*mss/cwnd+mss/8;
            if (cwnd>65535) {
               status=NORNAL; cwnd=65535;
            }
            break;
         case FR:
            cwnd=ssthresh; status=CA; break;
         }
      }
      snd_wnd=RSEG.ACK-snd_una; snd_una=RSEG.ACK;
      .
      return(TRUE_OFF): /* only receiving event was normally
                           processed.(sending event was processed.) */
}
```

Figure 12:
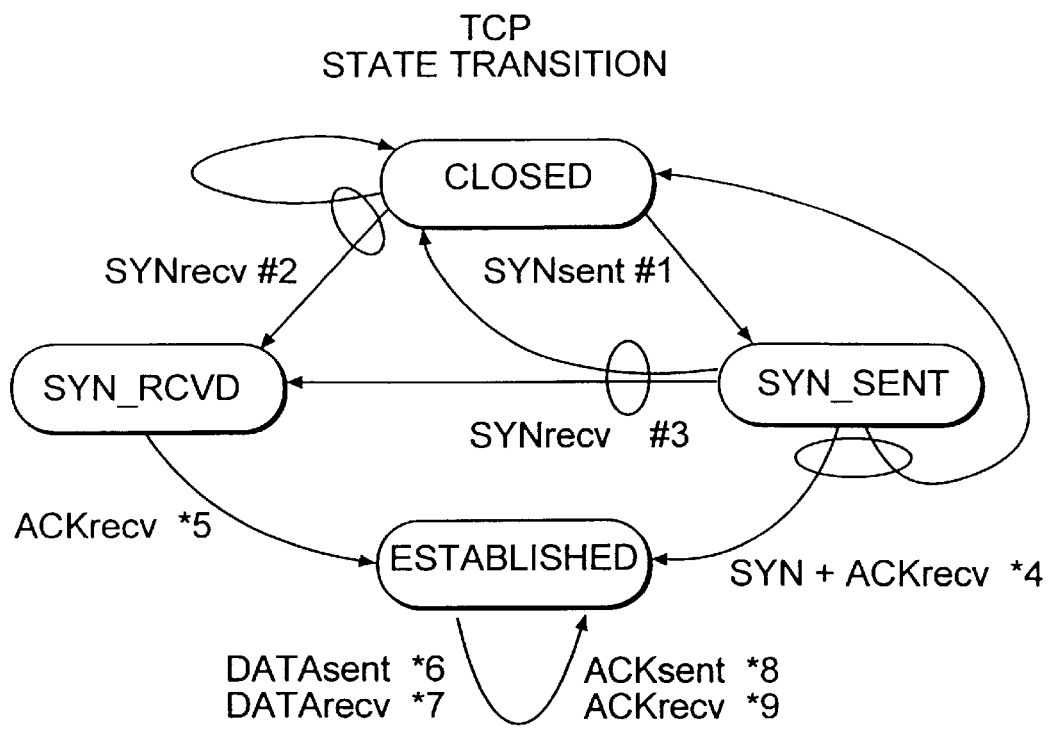
FIG. 12 shows a part of state transitions of TCP.
Figures 13A, 13B:
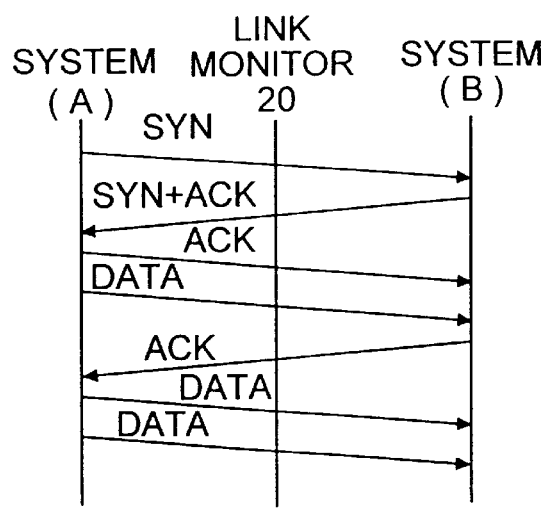
FIG. 13($a$) shows an example of a TCP simulation.

Referring to FIG. 12 and FIGS. 13(a)(b), an emulation sample according to an implementation of the above-mentioned TCP emulation will be explained. FIG. 13(a) shows a communication sequence between two communication systems (A) and (B). FIG. 13(b) shows a content of the event sequence log 45 on the communication system (A). The emulation is performed as follows (1)~(5).

(1) The TCP emulation part 44 extracts the sending event SYNsent from the event sequence log 45, then selects the transition #1. In this case, a result of the transition search is TRUE and a next state is SYN _SENT. The former state was CLOSED. The internal variables are estimated as follows, wherein SSEG.SEQ indicates a sequence number of a sending event and SSEG.WND indicates a window of the sending event.

iss=SSEG.SEQ
snd_una=iss
snd_nxt=iss+1
rcv_wnd=SSEG.WND
snd_max=snd_nxt
cwnd=mss
ssthresh=655335;
state=SYN_SENT
status=SS (2) Next, the TCP emulation part 44 extracts the receiving event SYN+ACKrecv from the event sequence log 45, further extracts the sending event ACKsent which is first sending event after the receiving event SYN+ACKrecv. In this case, the transition #4 is searched and a result of the transition search becomes TRUE and a next state becomes ESTABLISHED after recording that the sending event ACKsent was processed. The internal variables are estimated as follows, wherein SSEG.ACK indicates an ACK number of a sending event.

irs=RSEG.SEQ
snd_una=RSEG.ACK
rcv_nxt=irs+1
rcv_wnd=SSEG.WND
rcv_una=SSEG.ACK
snd_wnd=RSEG.WND
state=ESTABLISHED; return(TRUE_ON);

(3) Next, the TCP emulation part 44 extracts the sending event DATAsent from the event sequence log 45, then searches the transition #6. In this case, it is confirmed whether the internal procedure obeys the slow start procedure, then the internal variable is renewed. A result of the transition is TRUE. The internal variables are estimated as follows.
ssthresh=max(2#mss, min(cwnd, snd_wnd)/2)
cwnd=mss
status=SS;
(4) Next, the TCP emulation part 44 extracts the receiving event ACKrecv from the event sequence log 45, further extracts the sending event DATAsent which is first sending event after the receiving event ACKrecv.

In this case, the transition #9 is searched and the internal variable CWND is renewed to 2920 from 1460 because the internal variable status is SS. Since a result of the transition search is TRUE_OFF, the sending event DATAsent is not processed.
(5) In the same manner of the above case (3), the TCP emulation part 44 emulates residual two sending event DATsent and renews the internal variable.

Next, referring to the transitions #1~21 shown in FIG. 5, details of transition search at every sending event and details of transition search at every pair of a receiving event and a sending event will be explained. In this case, the state can take any value of CLOSED, SYN_SENT, SYN_RCVD, ESTABLISHED, FIN_WAIT_1, FIN_WAIT_2, CLOSING, CLOSE_WAIT, LAST_ACK, TIME_WAIT. Further, snd_nxt, snd_una, snd_wnd, mss, rcv_nxt, rcv_wnd, rcv_una, status (one of NORMAL, SS, CA and FR), cwnd, ssthresh, dupacks, finrecv_flag can be provided as internal variables.

A procedure for a state transition search of the sending event is describe below as [1]~[8].
[1] A case of sending event SYN in the state CLOSED:
In this case, the state is transitioned from CLOSED to SYN_SENT and a status is transitioned from NORMAL to SS because of estimating a start of the procedure slow start. Further, another internal variable is estimated based on a parameter of the sending segment SYN. As a result of the transition search, TRUE is returned. See the transition #1 shown in FIG. 5.
[2] A case of sending event DT or ACK in the state ESTABLISHED:
In a case of sending event DT, following ACK sending procedure (1) and DT sending procedure are performed, while in a case of sending event ACK, only following ACK sending procedure (1) is performed. See transitions #2-1 and #2-2 shown in FIG. 5.
(1) ACK send processing:
(i) In the case that an ACK number of sending segment is equal to rcv_una and TCP user data length of sending segment is zero, if a window of sending segment is larger than rcv_wnd, it is judged that the sending segment is ACK, then the internal variable rcv_wnd is renewed. If the window of sending segment is equal to rcv_wnd, it is judged that the sending segment is the duplicate ACK.
(ii) If the ACK number of sending segment is not equal to rcv_una, then it is judged that new receiving data is confirmed, then internal variables rcv_wnd and rcv_una are renewed. In a case that the internal variable finrecv_flag is ON and all data are confirmed (the ACK number of the sending segment is equal to rcv_nxt), the state is transited from ESTABLISHED to CLOSED_WAIT.
(2) DT send processing:
(i) In a case that a sequence number of sending segment is equal to the variable snd_next, the following (a) and (b) are performed.

(a) If a congestion control is emulating and a right side (snd_nxt+TCP user data length) of a sequence number of sending segment is larger than a right side (snd_nxt+TCP user data length) of the present window, it is judged that the emulation of the congestion control is stopped because it is possible to judge that the procedure does not obey the modern TCP. Namely, this protocol is the original TCP.
(b) The internal variable snd_nxt is increased by the TCP user data length.
(ii) In a case that a sequence number of sending segment is not equal to the variable snd_next, the following (a) and (b) are performed because it is possible to judge that data retransmit occurred.
(a) If a congestion control is emulating, the internal variable ssthresh is renewed to max (2*mss, min(snd_wnd, cwnd)), the internal variable cwnd is renewed to mss and the state is set to SS.
(b) The internal variable snd_nxt is increased by the TCP user data length.
(3) procedure of ending: TRUE is returned as a result of transition search.
[3] A case of FIN sending event in ESTABLISHED state:
A procedure that is the same to the procedure mentioned in above [2]-(1) and [2]-(2) is performed. Further, the state is transitioned to FIN_WAIT_1, then the emulation of the congestion control is finished. In this case, another internal variable is set based on a parameter of the FIN sending segment and TRUE is returned as a result of transition search. See the transition #3 shown in FIG. 5.
[4] A case of ACK sending event in the state FIN_WAIT_1:
A procedure same to the procedure mentioned in above [2]-(1) is performed. Further, if finrecv_flag is ON and a sending segment is an ACK sending segment for confirming FIN, the state is transited to CLOSEING. If the sending segment is not an ACK sending segment for confirming FIN, the state FIN_WAIT_1 is maintained. TRUE is returned as a result of transition search. See the transitions #4-1 and #4-2 shown in FIG. 5.
[5] A case of ACK sending event in the state FIN_WAIT_2:
A procedure same to the procedure mentioned in above [2]-(1) is performed. Further, if finrecv_flag is ON and a sending segment is an ACK sending segment for confirming FIN, the state is transited to TIME_WAIT. It the sending segment is not an ACK sending segment for confirming FIN, the state FIN_WAIT_2 is maintained. TRUE is returned as a result of transition search. See the transitions #5-1 and #5-2 shown in FIG. 5.
[6] A case of ACK sending event in the state CLOSE_WAIT:
A procedure that is the same as the procedure mentioned in above [2] is performed. See the transitions #6 shown in FIG. 5.
[7] A case of FIN sending event in the state CLOSE_WAIT:
A procedure that is the same as the procedure mentioned in above [3] is performed. See the transitions #7 shown in FIG. 5.
[8] A case of SYN sending event in the state TIMES_WAIT:
A procedure that is the same as the procedure mentioned in above [1] is performed because it is judged that the state has already transited to the state CLOSED. See the transitions #8 shown in FIG. 5.

A procedure for a state transition search of the receiving event is described below [9]~[21].
[9] A case of SYN receiving event in the state CLOSED.
(1) If the extracted sending segment is SYN+ACK, the state is transited to SYN_RCVD, the status is transited to SS because of estimation that the internal procedure slow start has been started. Further, another internal variable is estimated based on the parameter of receiving segment SYN and sending segment SYN or ACK. TRUE_ON is returned as a result of transition search. See the transition #9-1 shown in FIG. 5.

(2) If the extracted sending segment is RST+ACK, the state CLOSED is maintained, then TRUE _ON is returned as a result of transition search because of judgement that a connection request was denied. See the transition #9-2 shown in FIG. 5.

(3) If the extracted sending segment is not SYN+ACK and not RST+ACK, the state CLOSED is maintained, then TRUE_OFF is returned. See the transition #9-3 shown in FIG. 5.

Figure 14:
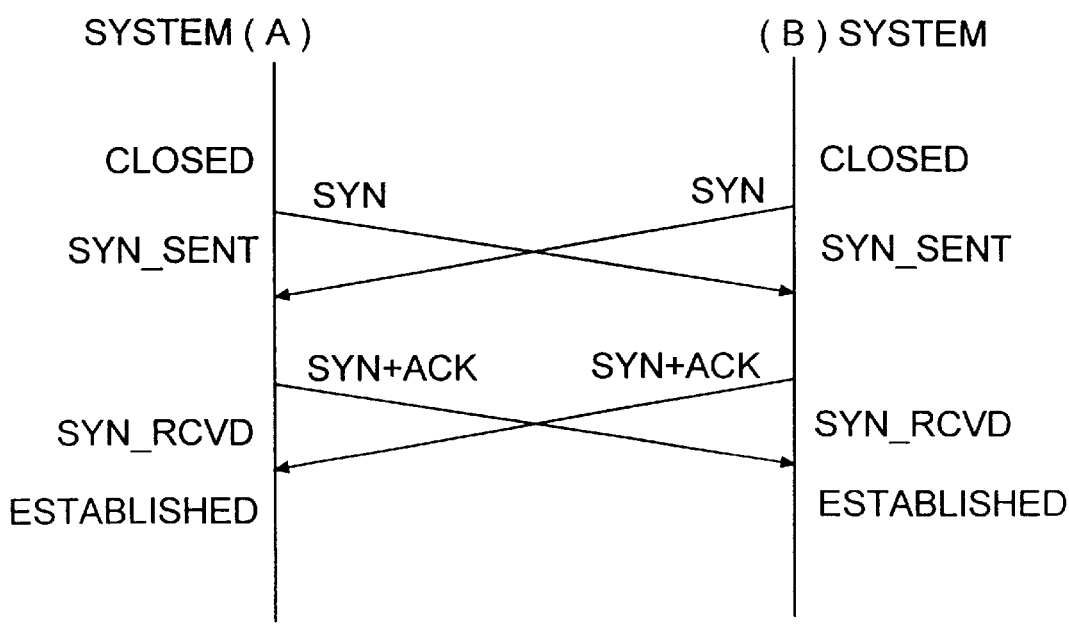
FIG. 14 shows a sequence with simultaneous connection requests in both directions.

[10] A case of SYN receiving event in the state SYN_SENT:

(1) If the extracted sending segment is SYN+ACK, the state is transitioned to SYN_RCVD. In this case, it is possible to consider that a simultaneous open occurred. Namely, there occurred a collision of both connection establishment requests. TRUE_ON is returned as a result of transition search. See the transition #10-1 shown in FIG. 5. As shown in FIG. 14, if the simultaneous open has occurred, the connection is established.

(2) If the extracted sending segment is not SYN+ACK, the state SYN_SENT is maintained, then TRUE_OFF is returned. See the transition #10-2 shown in FIG. 5.

[11] A case of SYN+ACK receiving event in the state SYN_SENT:

(1) If the extracted sending segment is ACK, the state is transitioned to ESTABLISHED, then TRUE_ON is returned as a result of transition search. See the transition #11-1 shown in FIG. 5.

(2) If the extracted sending segment is RST, the state is transitioned to CLOSED. In this case, TRUE_ON is returned as a result of transition search because of judgement that a connection request was denied. See the transition #11-2 shown in FIG. 5.

(3) If the extracted sending segment is not ACK and not RST, the state SYN_SENT is maintained, then TRUE_OFF is returned. See the transition #11-3 shown in FIG. 5.

[12] A case of ACK receiving event in the state SYN_RCVD:

The state is transitioned to ESTABLISHED, then TRUE_OFF is returned as a result of transition search. See the transition #12 shown in FIG. 5.

[13] A case of DT or ACK receiving event in the state ESTABLISHED:

In the case of DT receiving, a following ACK receiving procedure (1) and following DT receiving procedure are performed. In the case of ACK receiving, only a following ACK receiving procedure (1) is performed. See the transition #13 shown in FIG. 5.

(1) ACK receiving procedure:

(i) In the case that an ACK number of the receiving segment is equal to snd_una and TCP user data length of the receiving segment is zero, if the window of the receiving segment is equal to snd_wnd, following operations (a)~(d) are performed because of receiving a duplicate ACK.

(a) 1 is added to the variable dupacks.

(b) If the variable dupacks is larger than a predetermined value (for example, 3) and the internal procedure fast retarnsmit was performed, then variable ssthresh is renewed to max(2*mss, min(snd_wnd, cwnd)), the variable cwnd is renewed to ssthresh+3*mss, the status is set for FR. TRUE_ON is returned as a result of the transition search.

(c) However, the extracted sending segment is not DT indicating data transmit, the emulation of the congestion control is ended because the protocol is the original TCP. In this case, TRUE_OFF is returned as a result of the transition search.

(d) If the internal procedure fast retransmit is performing, the cwnd is added by mss. In this case, TRUE_OFF is returned as a result of the transition search.

(ii) In the case that an ACK number of the receiving segment is equal to snd_una but TCP user data length of the receiving segment is not zero, following DT receiving procedure (2) is performed.

(iii) In the case that an ACK number of the receiving segment is not equal to snd_una, it is judged that a new sending segment is acknowledged, then following operations (a)~(c) are performed.

(a) If the internal procedure slow start is in emulation (the state is SS), cwnd is increased by mss. However, if cwnd is larger than the maximum window size (65535), the emulation of the congestion control is ended. If cwnd is larger than ssthresh, congestion avoidance is emulated (the statue is CA).

(b) If the internal procedure congestion avoidance is in emulation, cwnd is increased by (mss#mss)/cwnd+mss/8. However, if cwnd is larger than the maximum window size (65535), the emulation of the congestion control is ended.

(c) If the internal procedure fast retransmit is in emulation, congestion avoidance is emulated.

(2) DT receiving procedure:

the variable rcv_nxt is increased by the length of TCP user data of sending data. In this case, the state ESTABLISHED is maintained and the state is not changed.

(3) Ending procedure: TRUE_OFF is returned as a result of the transition search.

[14] A case of FIN receiving event in the state ESTABLISHED:

A procedure same to the procedure mentioned in above [13] is performed. Further finrecv_flag is set to ON. TRUE is returned as a result of the transition search. See the transition #14 shown in FIG. 5.

[15] A case of DT or ACK receiving event in the state FIN_WAIT_1:

In the case of ACK receiving for confirming FIN, the state is transited to FIN_WAIT_2. See the transition #15-1 shown in FIG. 5. In the case of DT receiving, in addition to the ACK receiving procedure, a procedure same to the procedure mentioned in above [14] is performed. In the case of ACK receiving which dose not confirm FIN, the state FIN_WAIT_1 is maintained. TURE_OFF is returned as a result of the transition search. See the transition #15-2 shown in FIG. 5.

[16] A case of FIN receiving event in the state FIN_WAIT_1:

A procedure same to the procedure mentioned in above [13]-(1) and [13]-(2) is performed. Further, finrecv_flag is set to ON. See the transition #16 shown in FIG. 5.

[17] A case of DT or ACK receiving event in the state FIN_WAIT_2:

A procedure same to the procedure mentioned in above [13] is performed. Further, finrecv_flag is set to ON. See the transition #17 shown in FIG. 5.

[18] A case of FIN receiving event in the state FIN_WAIT_2:

A procedure same to the procedure mentioned in above [13]-(1) and [13]-(2) is performed. Further, finrecv_flag is set to ON. See the transition #18 shown in FIG. 5.

[19] A case of ACK receiving event in the state CLOSING:

In the case of ACK receiving for confirming FIN, the state is transited to TIME_WAIT. See the transitioned #19-1 shown in FIG. 5. In the case of ACK receiving which does not confirm FIN, the state CLOSING is maintained. TURE_OFF is returned as a result of the transition search. See the transition #19-2 shown in FIG. 5.

[20] A case of ACK receiving event in the state LAST_ACK:

In the case of ACK receiving for confirming FIN, the state is transited to CLOSED. See the transitioned #20-1 shown in FIG. 5. In the case of ACK receiving which dose not confirm FIN, the state LSAT_ACK is maintained. TURE_OFF is returned as a result of the transition search. See the transition #20-2 shown in FIG. 5.

[21] A case of SYN receiving event in the state TIME_WAIT:

A procedure same to the procedure mentioned in above [9] is performed because it is possible to judge that the state has been transited. See the transition #21 shown in FIG. 5.

It can be considered that an order of the event sequence is incorrectly estimated or that emulation is incorrectly performed. For example, if a delay of a buffering in the router is very large, an actual order of processing is different from the order of the event sequence estimated by the link monitor 20. This problem can be solved by permutation of the estimated event sequence by applying a heuristic algorithm such as a rule base programing.

In the above-mentioned embodiment, details of the communication are analyzed by the offline part 40. However, if using a sufficiently high speed apparatus such as a UNIX work station, is is possible to analyze the detailed communication and also to obtain PDU and to analyze in online processing.

In above-mentioned embodiment, the link monitor 20 and a method adaptive to the Internet link monitor by using the link monitor 20 are achieved by a CPU (Central Processing Unit) and a computer program. Namely, necessary facilities for analyzing detailed communication based on TPC is programmed into a software program and the program is recorded on an arbitrary recording medium by a format readable to the CPU. Then the CPU reads the program.

According to the present invention, there are achieved the following effects (1)~(3).

(1) It is possible to analyze details of the communication based on TCP/IP protocols. Especially, the present invention is useful to analyze the internal procedure of TCP for its flow control. For example, it is possible to inspect a cause of decreased throughput by estimating an occurrence of slow start or data retransmit.

(2) It is possible to emulate a behavior based on the TCP state transition and the internal procedure of TCP for the flow control such as slow start by the facility for PDU analysis and the facility for analysis of details of the communication, wherein the communication analysis facility is obtained by emulating a behavior of a TCP protocol entity in a specific pair of the communication systems. Therefor, it is possible to analyze details of the TCP/IP based communication, wherein the analysis includes estimation of a number of times of slow start, a number of a times of data retransmit based on timeout or fast transmit.

(3) The present invention has following merits (i)~(iii) in comparison with a link monitor adaptive to OSI.

(i) It is easy to design the link monitor because of emulating a single layer.

(ii) In the case of performing TCP emulation offline, it is very easy to design the link monitor.

(iii) TCP emulation is more complex than the emulation of OSI protocol. However, It is easy to design the link monitor adaptive to TCP because of a state based on the state transition of TCP in addition to a status which is a internal variable corresponding to the internal procedure of TCP.

What is claimed is:

1. A method for monitoring a communication link comprising:

using an emulation log of a communication system which performs communication based on TCP/IP protocol, an event sequence estimated based on the emulation log, a specification of TCP/IP state transition produced from TCP protocol specification, states of TCP protocol and internal variables of TCP protocol;

emulating a behavior of TCP protocol based on a state transition and an internal procedure of TCP protocol; and analyzing details of the communication by using a result of said emulating;

wherein, said specification of TCP/IP state transition includes:

a sending event procedure definition which defines at least one of states and internal variables after sending event processing, by prescribing a protocol data unit possible to be sent at every state and parameter conditions of the possible sending PDU;

a receiving event procedure definition which defines at least one of states and internal variables after receiving event processing on at least one of a parameter of a receiving event, a present state and a present internal variable; and an expected sending event definition which defines at least one of states and internal variables after sending event processing by prescribing parameter conditions of a sending PDU corresponding to the expected sending event.

2. The method according to claim 1, wherein said emulation log includes:

a time at which at least one of a starting point and an ending point of the TCP segment is detected;

a source IP address and a destination address in an IP header;

parameters, except for a checksum, in a TCP header;

a TCP user data length; and a flag indicating whether the checksum is right or not.

3. The method according to claim 1, wherein said emulating step comprises the steps of:

judging whether a sending event is possible to be sent by searching the TCP state transition specification, when the sending event is processed;

estimating at least one of a state after sending event processing and an internal variable after sending event processing on the sending event which can be sent, when the sending event is processed;

judging, when the receiving event processing is processed, whether a state transition is possible by extracting a sending event to be a response to a receiving event and by searching the TCP state transition specification;

estimating, in a case that the state transition is possible and the sending event is processed, a state or an internal variable after sending event processing based on the TCP state transition specification; and estimating, in a case that the state transition is possible but the sending event is not processed, a state or an internal variable after receiving event processing based on the TCP state transition specification.

4. The method according to claim 1, wherein said emulating step comprises the steps of:
   (a) successively extracting an event from the event sequence;
   (b) judging whether the extracted event is a sending event or a receiving event;
   (c) searching an executable transition from the TCP state transition specification when the extracted event is a sending event;
   (d) renewing the state and the internal variable when the search of step (c) is successful;
   (e) judging that there is a protocol error when the search of step (c) is not successful;
   (f) extracting, when the extracted event is a receiving event, a sending event from the event sequence, the sending event not being processed and being a first sending event after the receiving event;
   (g) searching a transition from the TCP state transition specification by assuming that the first sending event is a response to the receiving event;
   (h) judging that the receiving event is lost when the search of step (g) is not successful;
   (i) recording in the event log that the sending event is processed when the search of step (g) is successful and the sending event, which is assumed to be the response to the receiving event, is processed;
   (j) performing the corresponding transition by renewing the state and the internal variable after said recording; and
   (k) performing the corresponding transition by renewing the state and the internal variable when the search of step (g) is successful but the assumed sending event is not processed.

5. The method according to claim 1, wherein said emulating step comprises the steps of:
   further using a congestion ID indicating what kind of internal procedure for congestion control in TCP protocol is performed;
   estimating, as the congestion ID for the present congestion control, slow start, congestion avoidance, fast transmit, fast recovery and normal;
   judging an occurrence of the internal procedure for congestion control, ending of the internal procedure for congestion control, a value of the internal variable used by the internal procedure for congestion control at an opportunity of one of the sending event processing and receiving event processing;
   judging an occurrence of slow start at an opportunity of a time out;
   estimating a value of the internal variable at every DT sending and at every ACK receiving after the occurrence of slow start; and
   judging an occurrence of fast transmit and fast recovery at an opportunity of reception of three duplicate ACKs.

6. The method according to claim 1, wherein:
   a PDU, between a pair of the communication systems, is obtained from data flowing in a circuit line;
   the emulation log is made by analyzing the obtained PDU; and
   the event sequences of both communication systems, which perform sending and receiving the PDU, are estimated based on the emulation log.

7. An apparatus for monitoring a communication link comprising:
   means for recording an emulation log of a communication system which performs communication based on TCP/IP protocol;
   means for recording an event sequence being estimated based on the emulation log;
   means for recording a specification of TCP/IP state transition produced from TCP protocol specification; and
   means for analyzing details of the communication by emulating a behavior of TCP protocol based on a state transition and an internal procedure of TCP protocol by using said recorded information;
   wherein, said specification of TCP/IP state transition includes:
   a sending event procedure definition which defines at least one of states and internal variables after sending event processing, by prescribing a protocol data unit (PDU) possible to be sent at every state and parameter conditions of the possible sending PDU;
   a receiving event procedure definition which defines at least one of states and internal variables after receiving event processing on at least one of a parameter of a receiving event, a present state and a present internal variable; and
   an expected sending event definition which defines at least one of states and internal variables after sending event processing, by prescribing parameter conditions of a sending PDU corresponding to an expected sending event.

8. The method according to claim 3, wherein said emulating step comprises the steps of:
   further using a congestion ID indicating what kind of internal procedure for congestion control in TCP protocol is performed;
   estimating, as the congestion ID for the present congestion control, slow start, congestion avoidance, fast transmit, fast recovery and normal;
   judging an occurrence of the internal procedure for congestion control, ending of the internal procedure on congestion control, a value of the internal variable used by the internal procedure for congestion control at an opportunity of one of the sending event processing and receiving event processing;
   judging an occurrence of slow start at an opportunity of a time out;
   estimating a value of the internal variable at every DT sending and at every ACK receiving after the occurrence of slow start; and
   judging an occurrence of fast transmit and fast recovery at an opportunity of reception of three duplicate ACKs.

9. The method according to claim 4, wherein said emulating step comprises:
   further using a congestion ID indicating what kind of internal procedure for congestion control in TCP protocol is performed;
   estimating, as the congestion ID of the present congestion control, slow start, congestion avoidance, fast transmit, fast recovery and normal;
   judging an occurrence of the internal procedure for congestion control, ending of the internal procedure for congestion control, a value of the internal variable used by the internal procedure for congestion control at an opportunity of one of the sending event processing and receiving event processing;
   judging an occurrence of slow start at an opportunity of a time out;

estimating a value of the internal variable at every DT sending and at every ACK receiving after the occurrence of slow start; and judging an occurrence of fast transmit and fast recovery at an opportunity of reception of three duplicate ACKs.

10. The method according to claim 3, wherein:

a PDU, between a pair of communication systems, is obtained from data flowing on a circuit line;

the emulation log is made by analyzing the obtained PDU; and the event sequences of both communication systems, which perform sending and receiving the PDU, are estimated based on the emulation log.

11. The method according to claim 4, wherein:

a PDU, between a pair of the communication systems, is obtained from data flowing in a circuit line;

the emulation log is made by analyzing the obtained PDU; and the event sequences of both communication systems, which perform sending and receiving the PDU, are estimated based on the emulation log.

12. The method according to claim 5, wherein:

a PDU, between a pair of the communication systems, is obtained from data flowing in a circuit line;

the emulation log is made by analyzing the obtained PDU; and the event sequences of both communication systems, which perform sending and receiving the PDU, are estimated based on the emulation log.

13. The apparatus according to claim 7, wherein said emulation log includes information on:

a time at which at least one of a starting point and an ending point of the TCP segment is detected;

a source IP address and a destination address in an IP header;

parameters, except for a checksum, in a TCP header;

a TCP user data length; and a flag indicating whether the checksum is right or not.

14. The apparatus according to claim 7, wherein said analyzing means comprises:

means for judging whether a sending event is possible to be sent by searching the TCP state transition specification, when the sending event is processed;

means for estimating at least one of a state after sending event processing and an internal variable after sending event processing on the sending event which can be sent, when the sending event is processed;

means for judging, when the receiving event processing is processed, whether a state transition is possible by extracting a sending event to be a response to a receiving event and by searching the TCP state transition specification;

means for estimating, in a case that the state transition is possible and the sending event is processed, a state or an internal variable after sending event processing based on the TCP state transition specification; and means for estimating, in a case that the state transition is possible but the sending event is not processed, a state or an internal variable after receiving event processing based on the TCP state transition specification.

15. The apparatus according to claim 7, wherein said analyzing means comprises:

first means for successively extracting an event from the event sequence;

second means for judging whether the extracted event is a sending event or a receiving event;

third means for searching an executable transition from the TCP state transition specification when the extracted event is a sending event;

fourth means for renewing the state and the internal variable when the search performed by said third means is successful;

fifth means for judging that there is a protocol error when the search performed by said third means is not successful;

sixth means for extracting, when the extracted event is a receiving event, a sending event from the event sequence, the sending event not being processed and being a first sending event after the receiving event;

seventh means for searching a transition from the TCP state transition specification by assuming that the first sending event is a response to the receiving event;

eighth means for judging that the receiving event is lost when the search performed by said seventh means is not successful;

ninth means for recording in the event log that the sending event is processed, when the search performed by said seventh means is successful and the sending event, which is assumed to be the response to the receiving event, is processed;

tenth means for performing the corresponding transition by renewing the state and the internal variable after said recording; and eleventh means for performing the corresponding transition by renewing the state and the internal variable when the search performed by said seventh means is successful but the assumed event is not processed.

16. The apparatus according to claim 7, wherein said analyzing means comprises:

means for recording a congestion ID indicating what kind of internal procedure for congestion control in TCP protocol is performed;

means for estimating, as the congestion ID of the present congestion control, slow start, congestion avoidance, fast transmit, fast recovery and normal;

means for judging an occurrence of the internal procedure for congestion control, ending of the internal procedure for congestion control, a value of the internal variable used by the internal procedure for congestion control at an opportunity of one of the sending event processing and receiving event processing;

means for judging an occurrence of slow start at an opportunity of a time out;

means for estimating a value of the internal variable at every DT sending and at every ACK receiving after the occurrence of slow start; and means for judging an occurrence of fast transmit and fast recovery at an opportunity of reception of three duplicate ACKs.

17. The apparatus according to claim 7, wherein said apparatus further comprises:

means for obtaining a PDU between a pair of communication systems, from data flowing in a circuit line;

means for generating the emulation log by analyzing the obtained PDU; and means for estimating the event sequences of both communication systems which perform sending and receiving the PDU, based on the emulation log.

* * * * *